(12) United States Patent
Akira

(10) Patent No.: US 11,182,637 B2
(45) Date of Patent: Nov. 23, 2021

(54) X-RAY IMAGE PROCESSING SYSTEM AND METHOD, AND PROGRAM THEREFOR

(71) Applicant: Hitachi Solutions, Ltd., Tokyo (JP)

(72) Inventor: Naoto Akira, Tokyo (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 44 days.

(21) Appl. No.: 16/814,730

(22) Filed: Mar. 10, 2020

(65) Prior Publication Data

US 2021/0042561 A1   Feb. 11, 2021

(30) Foreign Application Priority Data

Aug. 9, 2019   (JP) .............................. JP2019-147053

(51) Int. Cl.
*G06K 9/46* (2006.01)
*G06K 9/62* (2006.01)
*G06T 7/00* (2017.01)

(52) U.S. Cl.
CPC ......... *G06K 9/4652* (2013.01); *G06K 9/6256* (2013.01); *G06T 7/0002* (2013.01); *G06T 2207/10024* (2013.01); *G06T 2207/10116* (2013.01); *G06T 2207/30112* (2013.01)

(58) Field of Classification Search
CPC .. G06K 9/4652; G06K 9/6256; G06K 9/2018; G06K 9/00771; G06K 9/34; G06K 2209/09; G06K 9/6267; G06T 7/0002; G06T 2207/10024; G06T 2207/10116; G06T 2207/30112; G06T 5/50; G06T 2207/20221; G06T 7/30; G01N 23/04; G01N 23/10; G01V 5/0016; G01V 5/0066; G06N 20/00

USPC ......................................................... 382/103
See application file for complete search history.

(56) References Cited

U.S. PATENT DOCUMENTS

| | | | |
|---|---|---|---|
| 2005/0058242 A1* | 3/2005 | Peschmann | G01R 27/06 378/57 |
| 2008/0283761 A1* | 11/2008 | Robinson | G01V 5/0016 250/370.09 |
| 2009/0080596 A1* | 3/2009 | Sowerby | G01V 5/0041 378/5 |
| 2010/0119037 A1* | 5/2010 | Kato | G01N 23/10 378/53 |
| 2010/0220835 A1* | 9/2010 | Gibson | G01V 5/0016 378/53 |
| 2017/0061664 A1* | 3/2017 | Ishii | G06T 11/60 |

FOREIGN PATENT DOCUMENTS

JP   2017-45441 A   3/2017

* cited by examiner

*Primary Examiner* — Ali Bayat
(74) *Attorney, Agent, or Firm* — Volpe Koenig

(57) ABSTRACT

Information on an area specified as having an article is acquired, synthesis is performed with X-ray transmission amounts acquired by a plurality of sensors in the same area (for example, the same background and the same luggage), and material information is estimated from the X-ray transmission amount synthesized again to generate a color image. As a synthesis target, for example, combination information of articles accumulated during operation is used, and articles having many combinations are used as combination of articles included in the same luggage. A color image generated by synthesis is used as learning data.

8 Claims, 11 Drawing Sheets

FIG. 3

220 CO-OCCURRENCE DATA TABLE

| LUGGAGE ID | PHOTOGRAPHING DATE AND TIME | SMART PHONE | WALLET | PET BOTTLE | CAMERA | WATCH | ... |
|---|---|---|---|---|---|---|---|
| 0000001 | 1902 12 11:15:41 | 1 | 1 | 1 | 0 | 0 | ... |
| 0000002 | 1902 12 11:15:45 | 1 | 0 | 0 | 1 | 0 | ... |
| 0000003 | 1902 12 11:15:52 | 1 | 0 | 0 | 2 | 1 | ... |
| 0000004 | 1902 12 11:15:59 | 0 | 1 | 0 | 0 | 1 | ... |
| 0000005 | 1902 12 11:16:06 | 1 | 1 | 0 | 1 | 0 | ... |
| 0000006 | 1902 12 11:16:30 | 1 | 1 | 1 | 0 | 0 | ... |
| 0000007 | 1902 12 11:16:37 | 0 | 0 | 1 | 0 | 1 | ... |
| 0000008 | 1902 12 11:16:57 | 1 | 1 | 0 | 0 | 0 | ... |
| 0000009 | 1902 12 11:17:04 | 1 | 1 | 0 | 0 | 1 | ... |
| ... | | ... | ... | ... | ... | ... | ... |

221 ARTICLE DATA TABLE

| ARTICLE ID | TYPE ID | OVERLAP PRESENCE OR ABSENCE FLAG | FREQUENCY OF USE | ADDITION METHOD FLAG |
|---|---|---|---|---|
| 10000001 | 5 | 1 | 1 | 0 |
| 10000002 | 3 | 0 | 0 | 0 |
| 10000003 | 2 | 0 | 0 | 0 |
| 10000004 | 6 | 1 | 0 | 0 |
| 10000005 | 2 | 1 | 0 | 0 |
| 10000006 | 6 | 1 | 1 | 1 |
| 10000007 | 7 | 0 | 1 | 0 |
| 10000008 | 7 | 1 | 0 | 0 |
| 10000009 | 8 | 1 | 0 | 0 |
| ... | ... | ... | ... | ... |

FIG. 8A

TRANSMISSION AMOUNT DATA (HIGH ENERGY)

TRANSMISSION AMOUNT DATA (LOW ENERGY)

```
65535,65535,64672,65535,64408,65535,65535,65535,65535,64443,65535,63917,···
65535,65535,65535,65535,65535,64706,65096,65535,64927,65535,65535,64981,···
65535,65535,65535,65535,65535,64506,64788,65206,65304,63394,65208,65069,···
65535,65535,64118,65472,65535,64644,65535,65535,64826,62767,65535,64981,···
65535,65535,62494,63823,64964,65535,64290,64021,63682,65535,65149,64442,···
65535,65535,65535,64521,64528,65535,65330,65535,65535,62651,65535,65535,···
65535,65535,65535,65535,65535,64890,64525,65535,65535,65535,64421,65535,···
65535,65535,65535,64410,62785,62723,62752,64021,64000,65506,65535,64471,···
65535,60972,65535,64996,64363,64060,65433,65535,65535,65230,64361,65535,···
65535,65535,65535,65520,63942,65535,63792,65371,64768,65128,65535,65040,···
 ··· , ··· , ··· , ··· , ··· , ··· , ··· , ··· , ··· , ··· , ··· , ··· , ···
```

FIG. 10A
BACKGROUND IMAGE
TRANSMISSION AMOUNT DATA
FIG. 10B
ARTICLE PORTION
TRANSMISSION AMOUNT DATA
HIGH ENERGY
LOW ENERGY
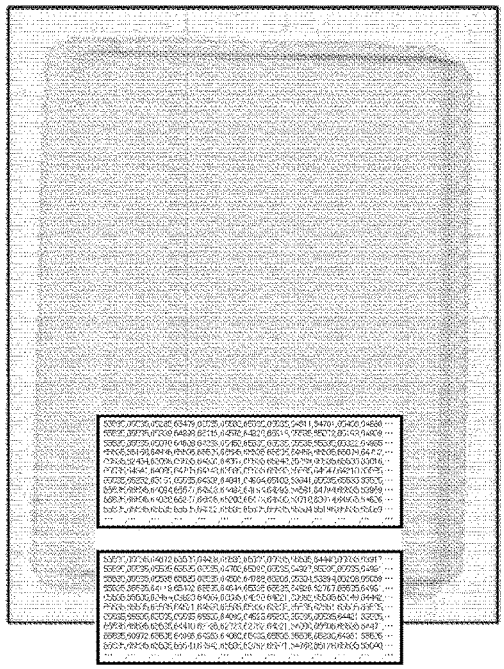
FIG. 10C
SYNTHESIS IMAGE
TRANSMISSION AMOUNT DATA
FIG. 10D
COLOR IMAGE
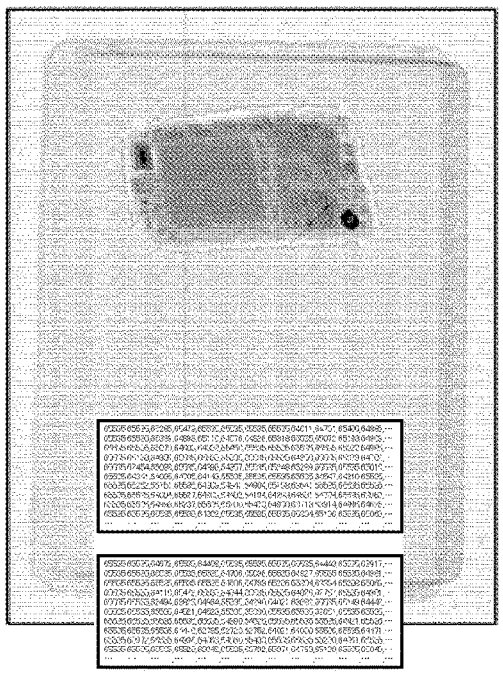

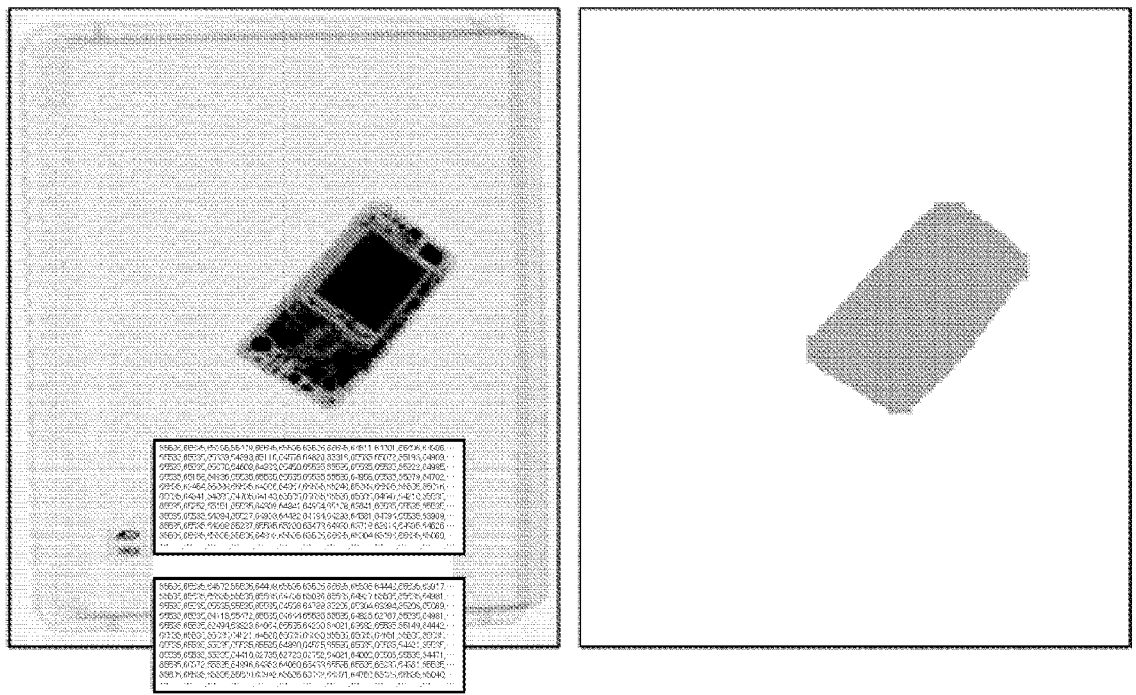

F I G. 1 2

ENERGY CONVERSION TABLE

| # | MATERIAL TYPE | TRANSMISSION AMOUNT (HIGH ENERGY) | LOW ENERGY AVERAGE VALUE |
|---|---|---|---|
| 1 | ORGANIC MATTER | 65535 | 65535 |
| 2 | ORGANIC MATTER | 65533 | 64931 |
| 3 | ORGANIC MATTER | 65532 | 64812 |
| 4 | ORGANIC MATTER | 65531 | 64808 |
| 5 | ORGANIC MATTER | 65523 | 64804 |
| 6 | ORGANIC MATTER | 65521 | 64801 |
| 7 | ORGANIC MATTER | 65520 | 64782 |
| 8 | ORGANIC MATTER | 65519 | 64775 |
| 9 | ORGANIC MATTER | 65516 | 64773 |
| ... | ... | ... | ... |

X-RAY IMAGE PROCESSING SYSTEM AND METHOD, AND PROGRAM THEREFOR

BACKGROUND OF THE INVENTION

1. Field of the Invention

The present invention relates to an X-ray image processing system, an X-ray image processing method, and a program therefor, and more particularly to a technique for determining an article included in an X-ray image acquired by an X-ray inspection apparatus used for baggage inspection.

2. Description of the Related Art

An X-ray baggage inspection apparatus is used for baggage inspection at airports, large-scale event venues, and the like. In general, the X-ray baggage inspection apparatus generates a grayscale image indicating an X-ray transmission amount or a color image in which each material is determined and colored, and an inspector visually checks the image to see if any dangerous article is present or absent. When the inspector finds a dangerous article, it is common to perform an open inspection on the luggage.

A highly-trained inspector is required to check whether or not an X-ray image includes a dangerous article. For this reason, it is difficult to temporarily secure a large number of inspectors, for example, at the time of a large-scale event in terms of prior training and cost. In order to reduce a burden on the inspector even a little bit, attempts have been made to automate the detection of the dangerous article.

As one measure for automating an image recognition, there is an image recognition technology utilizing deep learning by artificial intelligence (AI). Since the deep learning is widely used in video analysis applications and the like and a high recognition accuracy can be obtained, the deep learning has been spreading. However, a large amount of learning data is necessary in order to perform the learning, and it is necessary to prepare learning data covering various patterns in order to obtain the high recognition accuracy. As a technique using a machine learning for image recognition, for example, JP 2017-45441 A discloses a method of synthesizing images of an area acquired from two images after correcting color information of the images.

The technology described in JP 2017-45441 A is generally directed to images photographed by a security camera, a vehicle-mounted camera, or the like. Therefore, when synthesis targets overlap, it is possible to consider which image comes to the front. Further, since a type and a position of the image of the synthesis targets are limited based on installation position information of the camera, various conditions for the image recognition may be set in advance.

On the other hand, since an X-ray penetrates an article in an image synthesis for X-ray images, an image including features of a plurality of articles is acquired in an area where the articles overlap. Therefore, the technique of image synthesis in the related art cannot be used as it is. In addition, in the case of application to the X-ray baggage inspection, it is difficult to assume in advance what combination of articles is good, because it changes depending on a type and a time of an event to be inspected.

SUMMARY OF THE INVENTION

An object of the present invention is to improve an accuracy of image recognition using an X-ray image acquired in an X-ray inspection operation.

According to a preferred example of an X-ray image processing system according to the present invention, information on an area specified as having an article is acquired, synthesis is performed with X-ray transmission amounts acquired by a plurality of sensors in the same area (for example, the same background and the same luggage), and material information is estimated from the X-ray transmission amount synthesized again to generate a color image. In one example, as a synthesis target, it is preferable to use combination information of articles accumulated during operation, for example, articles having many combinations as combination of articles included in the same luggage. A color image generated by synthesis is used as learning data.

According to the present invention, it is possible to improve an accuracy of image recognition using an X-ray image acquired in an X-ray inspection operation. In addition, by constructing learning data using an image synthesized with the X-ray image, it is possible to recognize articles with high accuracy even when the articles overlap.

BRIEF DESCRIPTION OF THE DRAWINGS

FIG. 3 is a diagram showing a configuration of a co-occurrence data table 220 and an example of data;

FIGS. 8A and 8B are diagrams illustrating an example of transmission amount data of two types of articles according to the second embodiment;

FIGS. 10A-10D are diagrams illustrating an example of transmission amount data of two types of articles according to the second embodiment;

FIGS. 11A-11C are diagrams illustrating an example of transmission amount data of two types of articles according to the second embodiment; and FIG. 12 is a diagram showing a configuration and data rows of an energy conversion table.

DETAILED DESCRIPTION OF THE PREFERRED EMBODIMENTS

Hereinafter, preferred embodiments of an X-ray image processing system of the present invention will be described.

First Embodiment

Figure 1:
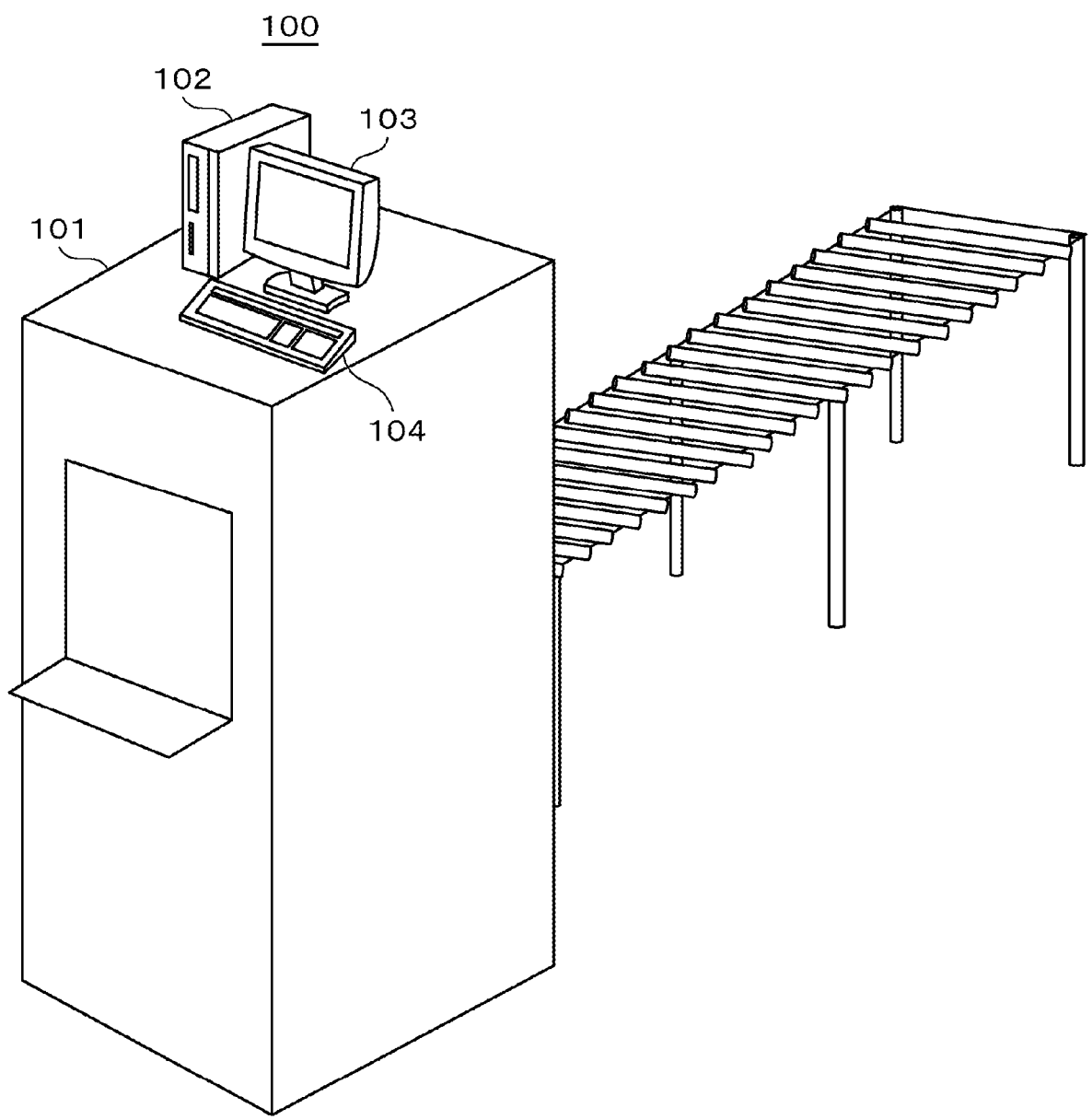
FIG. 1 is a configuration diagram of an X-ray inspection apparatus.

FIG. 1 is a configuration diagram of an X-ray inspection apparatus according to an embodiment of an X-ray image processing system.

An X-ray inspection apparatus 100 is an apparatus widely used as a baggage inspection apparatus in, for example, airport security inspection, and includes an X-ray apparatus main body (hereinafter, referred to as an apparatus main body) 101, a processing apparatus 102, a display unit 103, and an input unit 104. The processing apparatus 102 is, for example, a personal computer (PC).

The apparatus main body 101 includes an irradiation mechanism configured to radiate an X-ray and an X-ray photographing mechanism configured to photograph an object such as a baggage and measure a transmission amount of the X-ray, and outputs X-ray transmission amount data (hereinafter, it may be simply referred to as transmission amount data or transmission amount). The processing apparatus 102 determines whether or not the baggage is safe based on an article recognition result of an X-ray image photographed by the apparatus main body 101, and learns a model for image recognition using accumulated product information. The display unit 103 is a display terminal that displays the X-ray image, and allows an inspector to visually check the X-ray image displayed on a screen.

The apparatus main body 101 includes a transport mechanism including a belt conveyor that transports the luggage, and the transport mechanism is controlled by a control unit to drive and stop the belt conveyor. The apparatus main body 101 includes a display lamp, and when the control unit determines that the luggage is a dangerous baggage (an alert target object) as a result of article recognition, the display lamp is turned on to notify the inspector that the baggage is the alert target object.

Two types of X-ray sensors (hereinafter, simply referred to as sensors) for measuring an X-ray transmission amount are arranged in the transport mechanism and acquire two types of data. That is, one sensor acquires low energy data, and the other sensor acquires high energy data. The processing apparatus 102 determines material of an object based on a difference between the high energy data and the low energy data acquired by the two sensors. The X-ray sensor only needs to be able to acquire X-ray data from which material can be determined, and a detection method of the X-ray sensor does not matter. For example, a back scattering type material determination sensor or the like may be used. Note that the acquisition of X-ray data by the X-ray sensor can be referred to as an X-ray data acquisition unit.

Figure 2:
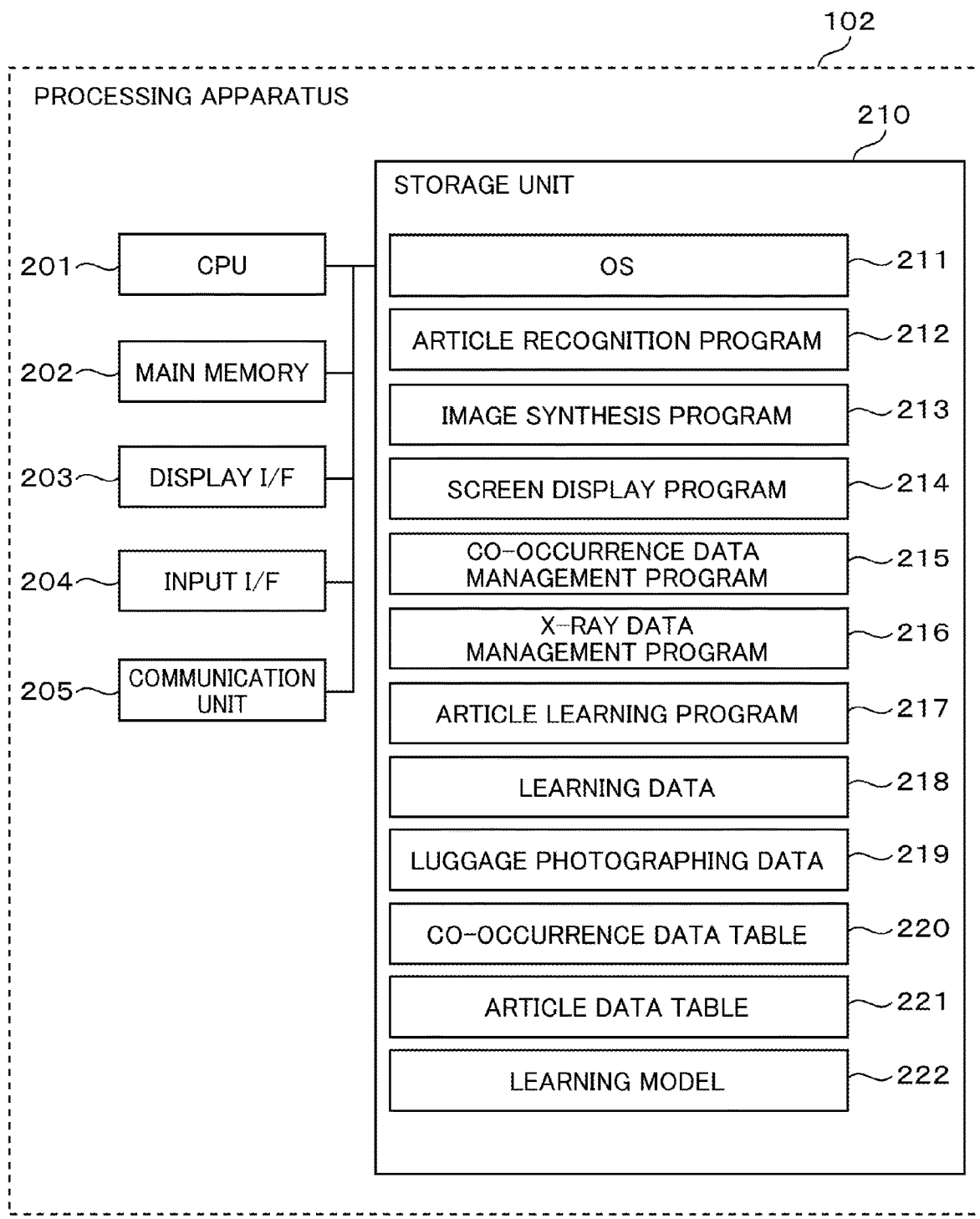
FIG. 2 is a functional configuration diagram of a processing apparatus 102.

FIG. 2 is a functional configuration diagram of the processing apparatus 102.

The processing apparatus 102 is an information processing apparatus which includes a processing unit (CPU: Central Processing Unit) 201, a main memory 202, a display interface (I/F) unit 203 connecting the display unit 103, an input interface (I/F) unit 204 connecting the input unit 104, a communication unit 205, and a storage unit 210.

The processing unit 201 implements a predetermined function or operation by executing a program. The storage unit 210 stores an article recognition program 212, an image synthesis program 213, a screen display program 214, a co-occurrence data management program 215, an X-ray data management program 216, an article learning program 217, learning data 218, luggage photographing data 219, a co-occurrence data table 220, an article data table 221, and a learning model 222.

Here, the article recognition program 212 uses a deep learning segmentation technique for a color image in which luggage material information and article density information generated from the X-ray transmission amount data photographed by the apparatus main body 101 are visualized, and recognizes the articles included in the image in pixel unit. Details of an operation by the article recognition program 212 will be described later.

The image synthesis program 213 generates combination of articles using the co-occurrence data table 220, and synthesizes an image at a specified or randomly specified position using two types of high and low energies of an area of the article. Details of the operation of the image synthesis program 213 will be described later.

The screen display program 214 displays on the display unit 103 a color image or a grayscale image generated from the X-ray transmission amount data photographed by the apparatus main body 101 and inspection target article information. Further, when there is an inspection target article that could not be recognized, additional article information is acquired by receiving specification of the area and type of the article from the input unit 104 such as a mouse. Details of an operation of the screen display program 214 will be described later.

The co-occurrence data management program 215 aggregates combination of articles brought in together from the article information recognized during the baggage inspection, and generates combination information on the articles used in image synthesis. Details of an operation of the co-occurrence data management program 215 will be described later.

The X-ray data management program 216 generates a color image indicating material and density information from the X-ray transmission amount data measured by the two types of sensors in the apparatus main body 101, and registers the transmission amount data and the color image in the luggage photographing data 219. That is, the material of the article is determined from a difference between the X-ray transmission amount data of the two sensors, and the color image is generated in which the material information is a color type and the transmission amount is a color density (a high density portion is dark, and a low density portion is light). When there is a request to acquire the luggage photographing data 219, data of specified conditions is provided to a request destination.

The article learning program 217 performs a learning by using a segmentation process of deep learning using the input color image and tag data, and the like, and generates a learning model 222.

When executed by the processing unit 201, the article recognition program 212, the image synthesis program 213, the screen display program 214, the co-occurrence data management program 215, the X-ray data management program 216, and the article learning program 217 stored in the storage unit 210 function as an article recognition unit 212', an image synthesis unit 213', a screen display unit 214', a co-occurrence data management unit 215', an X-ray data management unit 216', and an article learning unit 217', respectively.

The learning data 218 registers the color image and the tag data used for learning. The learning data 218 is a data set or a data area for storing the learning data. The color image is image data generated by the X-ray data management program 216. The tag data is data representing an outline of the article, that is, data whose outline represents the type of the article, and is associated with an article ID of the article data table 221 (described later).

The luggage photographing data 219 stores an X-ray luggage image photographed by the apparatus main body 101, that is, two types of high and low transmission amount data, a color image, and a grayscale image. A luggage ID of the co-occurrence data table 220 (described later) is given to the luggage photographing data 219.

As shown in FIG. 3, the co-occurrence data table 220 stores information on an article recognition result for each luggage acquired by the co-occurrence data management program 215. That is, photographing date and time and presence or absence of a detected article such as a smartphone, a wallet, a PET bottle, a camera, and a timepiece are stored in correspondence with the luggage ID given to each luggage.

Figures 4, 5:
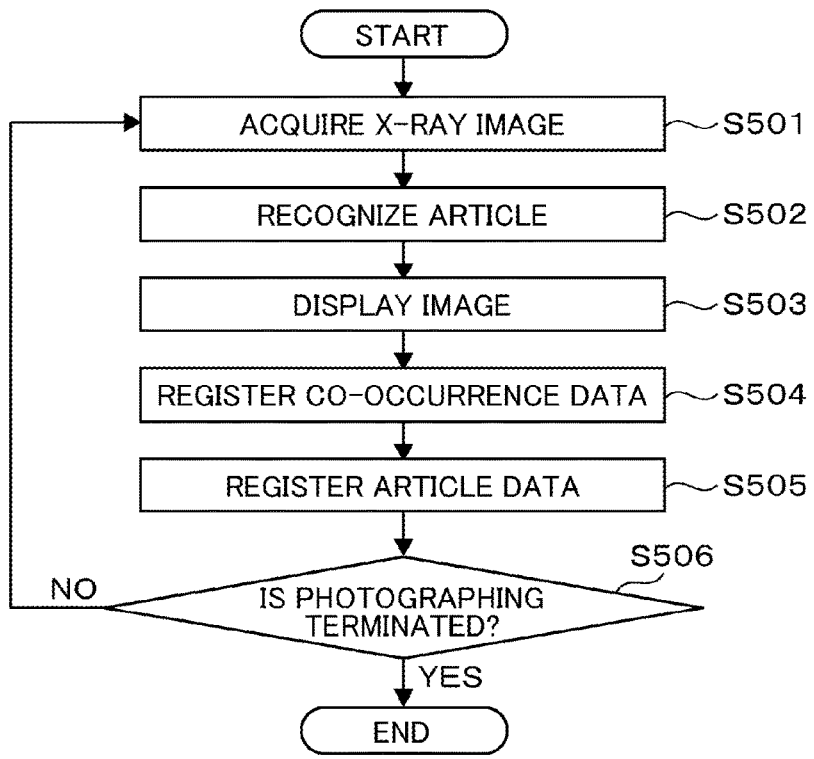
FIG. 4 is a diagram showing a configuration of an article data table 221 and an example of data.
FIG. 5 is a flowchart illustrating a processing operation of article recognition.

As shown in FIG. 4, the article data table 221 registers information such as a type, an overlap presence or absence, a frequency of use, an addition method of the article recognized from the X-ray luggage image (the luggage photographing data 219). That is, in the article data table 221, for each article ID that specifies the article, a type ID indicating the type of the article, an overlap presence or absence flag indicating whether or not the article overlaps with another article, a frequency of use indicating the number of times of use for learning, and an addition flag indicating whether addition of the article information is a recognition result or an additional registration, and the like are registered. Here, for the determination of the overlap presence or absence, any method may be used as long as it can be determined that there is a possibility of overlap when pixels of two articles are in contact with each other. Further, for each article ID, the color image and the grayscale image indicated by a rectangle surrounding the article, two types of high and low transmission amount data of the article area, and mask data indicating the pixel where the article exists are separately registered in the luggage photographing data 219 in the storage unit 210 and linked with the article ID of the article data table 221. Values corresponding to the number of rectangular pixels surrounding the article area are stored in the mask data, and 1 is registered for the pixel of the article and 0 is registered for the other pixels. As long as the position of the article can be specified in pixel unit, data may be stored in another format.

In the learning model 222, parameter information of the model learned by the article learning program 217 is registered.

Next, a processing operation for recognizing and displaying the article will be described with reference to FIG. 5. This processing operation is performed in a daily inspection operation using the X-ray inspection apparatus 100.

First, the X-ray data management program 216 acquires transmission amount data of X-rays photographed by a plurality of sensors and determines the material of pixel unit of the image from difference information of the transmission amount data of the plurality of sensors in order to determine the material. For the determination of the material, for example, a method of classifying metals, inorganic substances, organic substances, and other four types based on difference information of two types of high and low energy transmission amounts which is widely known in this field can be used. Next, by using the material information and the X-ray transmission amount of the specified sensor, a color image whose material information is a color type and whose transmission amount is a color density (a high density portion is dark and a low density portion is light) is generated, and the X-ray transmission amount data and the color image of the two sensors are registered in the luggage photographing data 219 (S501).

Next, the article recognition program 212 acquires the color image acquired in step S501, and recognizes the article in pixel unit using the segmentation process of deep learning (S502). Here, a library such as "Fully Convolutional Instance-aware Semantic Segmentation" widely known as an open source software (OSS) library may be used for the recognition of the article. Any recognition method may be used as long as the article can be specified in pixel unit.

Next, when the recognition result of step S502 includes an alert target article as an inspection target, the screen display program 214 displays an image in which the pertinent portion is highlighted on the display unit 103 (S503). Here, the highlight display can be realized by, for example, surrounding the alert target article with a red rectangle. The method of highlight display is not limited as long as an area of the alert target object is known. When the inspector confirms a prohibited object that is not highlighted, an input of an outline and a type of the article may be received with the input unit 104 such as a keyboard or a mouse, and the input may be registered as additional article information in the article data table 221. Here, specification of the outline of the article may be input by surrounding the outline with a plurality of points or by tracing the outline with hand using the display unit 103 such as a touch panel. In addition, for the alert target article and other articles, it is also possible to define in advance which of the grayscale image and the color image is easier to see for each article, and change and display coloring of color and grayscales for each article based on such definition. In normal inspection operation, the inspection may be performed while switching and displaying the entire image in color and grayscale. In that case, by performing the coloring in accordance with visibility of each article for each article, an efficiency of the inspection may be expected. Since the coloring method may be realized by switching a color of a pixel specified as having an article between color and grayscale, a detailed description thereof is omitted.

Next, the X-ray data management program 216 registers the number of articles for each luggage recognized in step S502 in the co-occurrence data table 220 (S504). The number of articles additionally specified in step S503 is also registered in the co-occurrence data table 220. As a result, the types and the number of the articles are registered for each luggage ID in the co-occurrence data table 220. (The number of articles may be referred to as frequency information.)

Next, the X-ray data management program 216 registers, in the article data table 221, the image information and transmission amount data of the article recognized in step S502 and the image information and transmission amount data of the article additionally specified in step S503 (S505). As a result, in the article data table 221, a type ID of the article, an article overlap presence or absence flag, a frequency of use indicating the number of times of use for learning, an article information addition method flag, and the like are registered in correspondence with the article ID.

Then, when the screen display program 214 receives an instruction of terminating the photographing, the process ends. When there is no instruction, the processes of steps S501 to S505 are executed until there is the instruction of terminating the photographing (S506). Since contents of the co-occurrence data table 220 and the article data table 221 are rewritten each time data of the luggage or the article is registered, it may be said that the contents of the tables are updated.

Next, operations of generating and learning the learning data 218 will be described with reference to FIG. 6.

First, the co-occurrence data management program 215 acquires co-occurrence data from the co-occurrence data table 220, sums up combination information of articles that frequently appear within a specified period (for example, one week), and selects combination of the articles frequently appeared as an article list (S601). For example, data having the same number of articles may be arranged in order of frequency, and candidates may be selected in descending order of frequency, and the first combination of articles may be selected. In the example of the co-occurrence data table 220 shown in FIG. 3, combination of a smartphone and a wallet has a high frequency. After the first list is used, a list used in the past may be given a lower priority so as not to be limited to a specific combination of articles, such as using the second list.

Next, the image synthesis program 213 selects the article data of the article selected in step S601 from the article data table 221 (S602). Here, acquisition of the article data is performed such that the image of the article used less frequently for the learning and the image of the article added manually (could not be recognized) is preferentially selected, and is randomly selected from candidate articles that match a condition determined in advance. Further, the article data acquired from the image where the article overlaps another article is excluded from the selection because there is a possibility that a part of the article data is missing or a part of another article is included in the article data.

Next, the image synthesis program 213 selects an arrangement position in the image of the article acquired in step S602 (S603). For the image position, a rotation angle of the image (0 to 360 degrees) and starting point coordinates X and Y (0<X<a width of a luggage image, and 0<Y<a height of the luggage image) are acquired by random numbers, and X and Y are selected such that the image of the article does not protrude from the area of the luggage image. A size of the luggage image is defined in advance, and a position of the article relative to the image is selected without the article of the X-ray luggage such as a bag or tray determined in advance.

Next, the image synthesis program 213 performs synthesis of the article data selected in step S602 with the position and the rotation angle selected in step S603 (S604). Since the article is added to the bag, the tray, or the like in normal luggage image, the synthesis in the present disclosure is performed by preparing a large amount of photographing data only for the tray and the bag in advance and adding the article to the image selected from the photographing data. When there are a plurality of articles, the synthesis may be performed by adding the articles one by one in such a way that the synthesis for the first article is performed using the image of only the tray or the bag and the image of the article and the synthesis for the second article is performed with respect to the image to which the first article is added. An alert target article, such as a dangerous article, needs to be actively included in the learning data even if a frequency of the alert target article is low, and therefore the alert target article may be intentionally added to the combination once in the number of times determined in advance.

Here, in the image synthesis, the position of the article is acquired from the mask data of the article data, two types of transmission amount data of coordinates including the article are acquired, and with respect to a transmission amount A of the article and a transmission amount B of the luggage image (including a case where the article has already been added), a value calculated by the following formula is used as a new transmission amount when the transmission amount A and the transmission amount B overlap with each other. The following calculation formula is an example, and another calculation formula may be used as long as a change in the transmission amount when the articles overlap may be approximated.

(Transmission amount $A$/Transmission amount MAX)×(Transmission amount $B$/Transmission amount MAX)×Transmission amount MAX [Formula]

Here, the transmission amount MAX is a maximum value of the sensor of the device acquired when there is no luggage, and for example, a value such as "65535" is set. The calculation of the transmission amount when two articles are overlapped is performed on the transmission amount data of the two sensors, such that the change in the transmission amount when the article and the luggage images are overlapped may be approximated.

Next, the X-ray data management program 216 specifies the material of each pixel from the difference information of the two transmission amounts for the two transmission amounts acquired by synthesizing all the articles, generates a color image, and registers the color image together with the tag data indicating the pixel with the article and the type in the learning data 218 (S605). By using the synthesizing method of the present embodiment, it is possible to perform the synthesis in consideration of the overlap that cannot be synthesized with a color image, so that more natural learning data can be generated.

Next, N pieces of learning data are generated by repeating processes of steps S602 to S605 a predetermined number of times, and registered in the learning data 218 (S606). The article data used for synthesis and a synthesis position are different even for the same article list, and therefore a different luggage image is generated each time. Therefore, when generating N pieces of luggage images for an M-pattern article list, it is preferable to set N so that M×N falls within the time that can be used for generating the learning data.

Next, processes of steps S601 to S606 is executed until there is an instruction of terminating an article list selection, and when there is the instruction of terminating the selection, the process ends (S607).

Next, the learning data 218 is read out by the article learning program 217, and model learning is executed by a method capable of specifying the article in pixel unit such as the deep learning segmentation method (S608). For the learning, the image data and the tag data indicating at which coordinates the article is present are required, but since the position of the article can be specified at the time of synthesis, such information may be used as the tag data to perform the learning.

Figure 6:
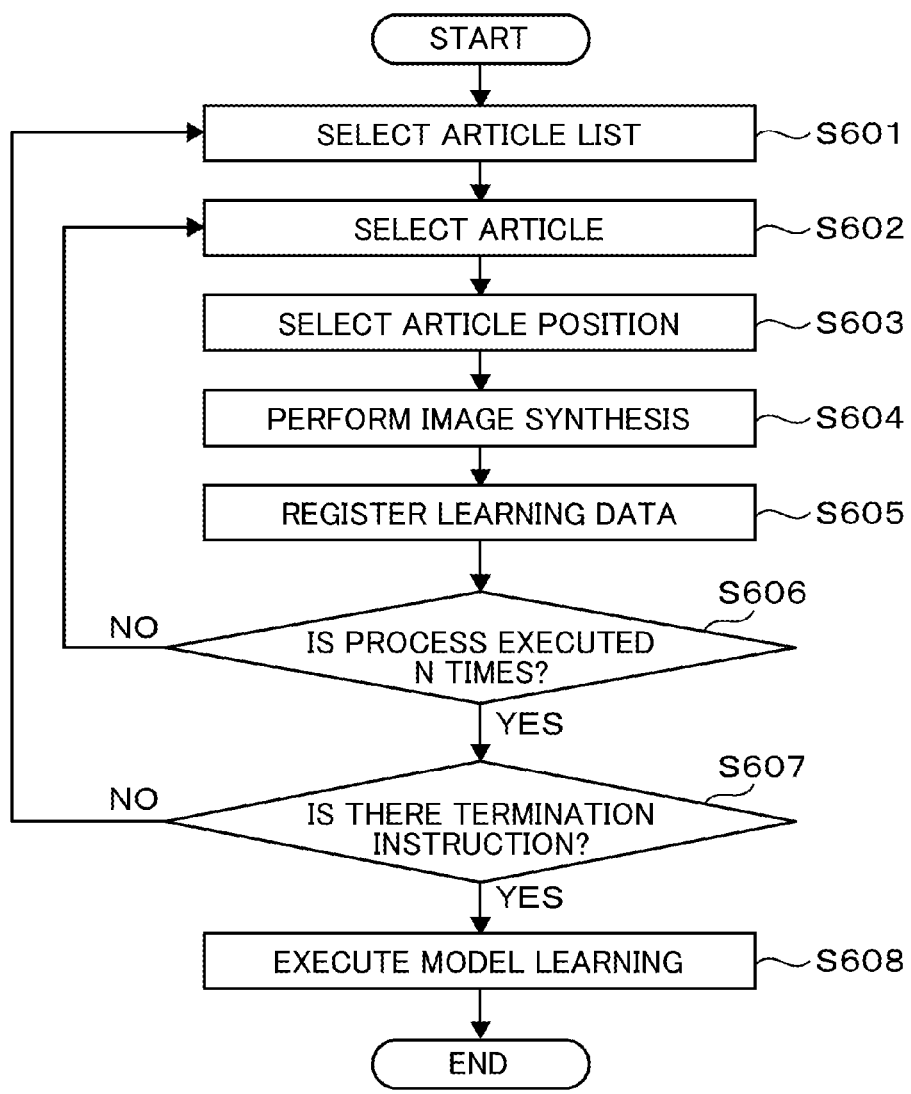
FIG. 6 is a flowchart illustrating operations to generate and learn learning data 218.

Processing operations of FIGS. 5 and 6 in the present embodiment are performed by several programs illustrated in FIG. 2 in cooperation with each other, but each of these operations may be realized as one program.

Second Embodiment

An X-ray image synthesis according to the second embodiment will be described with reference to FIGS. 7 to 12.

Figure 7:
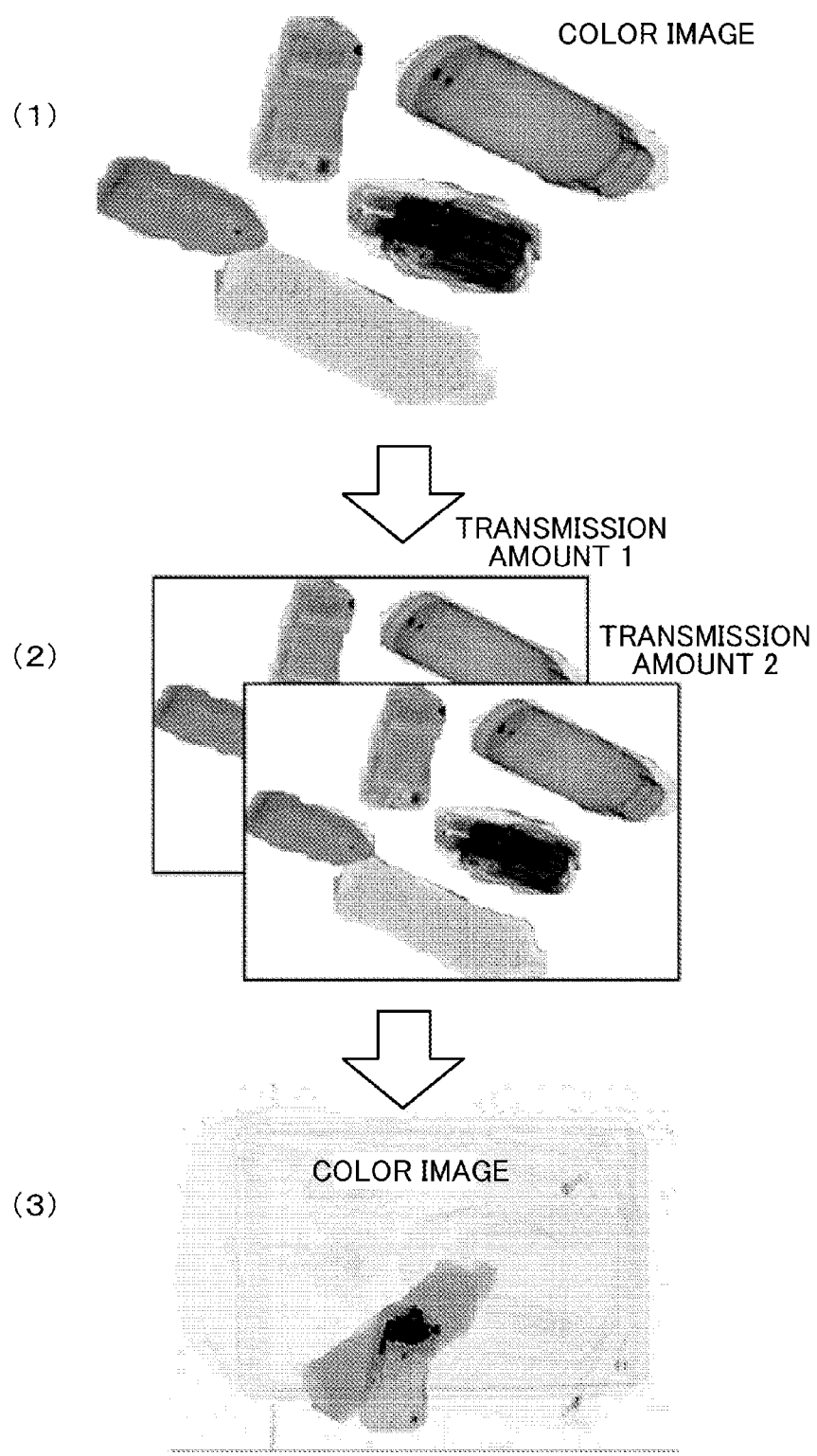
FIG. 7 is a diagram illustrating a relationship between a color image and a transmission amount according to a second embodiment.
Figures 8A, 8B:
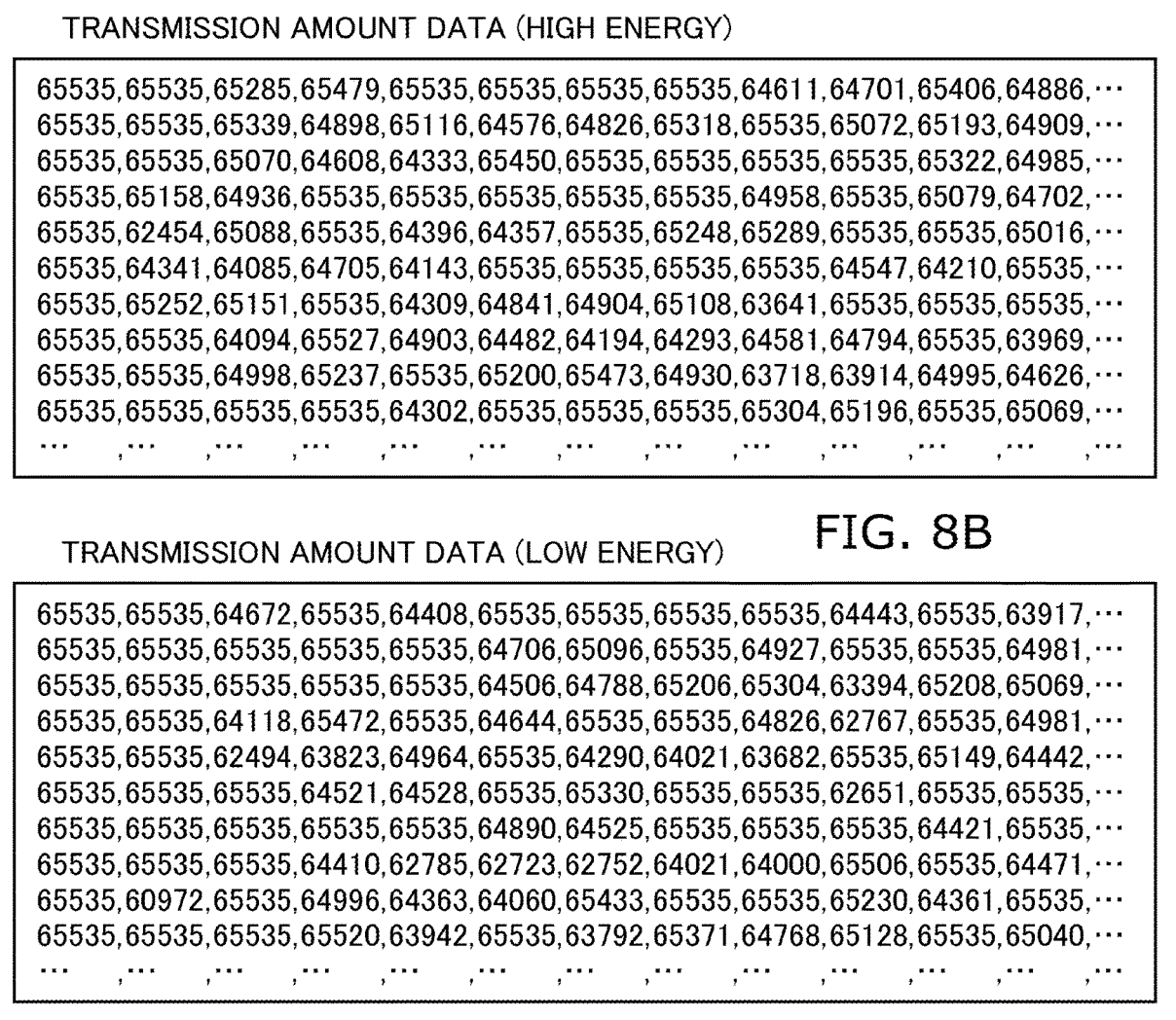

The second embodiment is based on the processing apparatus 102 of FIG. 2 according to the first embodiment, but differs from the first embodiment in terms of the image synthesis method. As schematically illustrated in FIG. 7, positions of a plurality of articles are specified by color image (FIG. 7(1)), the article synthesis is performed by the X-ray transmission amount (FIG. 7(2)), and a color image is generated again from the X-ray transmission amount (FIG. 7(3)), whereby the color image necessary for deep learning is generated. Since the conversion from the X-ray transmission amount to the color image is an irreversible conversion, the synthesis according to the second embodiment is realized by holding both two types of X-ray transmission amounts and the color image. As illustrated in FIGS. 8A and 8B, (two types of) transmission amount data of an image (for example, having a resolution of 640×480) as a background of synthesis image to be synthesized using (a) high energy transmission amount data and (b) low energy transmission amount data and (two types of) article transmission amount data are synthesized on a pixel-by-pixel basis using the following Equations (1) and (2).

$$P_{M,low}(x, y) = 65535 * \left(\frac{P_{1,low}(x, y)}{65535}\right)\left(\frac{P_{2,low}(x, y)}{65535}\right) \quad \text{[Equation 1]}$$

$$P_{M,high}(x, y) = 65535 * \left(\frac{P_{1,high}(x, y)}{65535}\right)\left(\frac{P_{2,high}(x, y)}{65535}\right) \quad \text{[Equation 2]}$$

Note that P1 and P2 are transmission amounts of target pixels of each image, and when two or more images are simultaneously synthesized, the integration is similarly performed for P3. Here, x and y indicate positions of the pixels, x=0 and y=0 at the upper left of the image, x is larger in the right direction, and y is larger in the lower direction.

Figure 9:
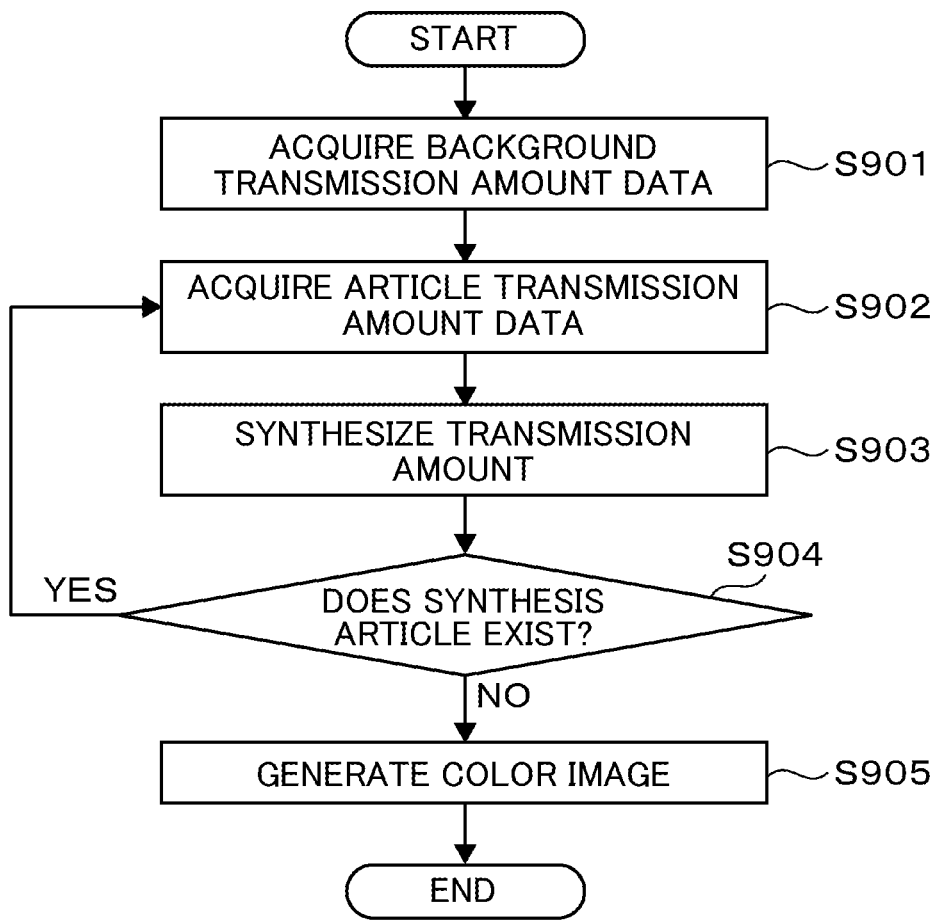
FIG. 9 is a flowchart illustrating a processing operation of synthesizing articles according to the second embodiment.

Next, with reference to the flowchart in FIG. 9, an image synthesis processing operation according to the second embodiment will be described.

As illustrated in FIG. 10A, an image synthesis program 213 acquires transmission amount data of the background obtained by photographing a tray, a bag, or the like, from luggage photographing data 219 (S901). In addition, luggage photographing data in which objects other than the tray and the bag are already captured may be acquired.

Next, the image synthesis program 213 refers to an article data table 221 and acquires synthesis target article transmission amount data (S902). Since a shape of the article is not limited to a rectangle, the article transmission amount data includes information specifying the pixel where the article is present, such as mask data (a color image detection result) illustrated in FIG. 11B. For example, 1 is registered for the pixel where the article is present, and 0 is registered for the pixel where no article is present. When a plurality of articles are expressed by one mask data, 0 is registered for the pixel where no article is present, and an ID (>=1) for identifying the article is registered for other pixels.

Next, the image synthesis program 213 synthesizes the transmission amounts by a synthesis method using the equations shown in [Equation 1] and [Equation 2] (S903). When the transmission amount is not 65536 level, portions of 65535 are adjusted to the number of level.

Next, when there is another synthesis target article, steps S902 to S903 are repeated (S904).

Next, the X-ray data management program 216 generates a color image from the synthesized transmission amount (two types of high and low energies) data, and outputs the color image, together with information indicating the type of the article of each pixel, as learning data (S905). This process is an operation illustrated in FIGS. 10C and 10D. The learning data, together with the information indicating the type of the article of each pixel, is stored in the learning data 218.

When the input data from the apparatus main body 101 is not the two types of high and low energy data but is only the color image, the color image is converted to grayscale, and an image conversion is performed such that a high density portion is a dark image and a low density portion is a light image, whereby a value of each pixel of a grayscale image can be set to high energy or low energy. However, since two types of transmission amount data are required to synthesize the article, the transmission amount is estimated using, for example, an energy conversion table shown in FIG. 12 for converting the transmission amount (assumed to have high energy) into low energy. When the energy conversion table does not have a corresponding value, it is preferable to use the conversion value of the transmission amount having the closest value. The energy conversion table is prepared in the storage unit 210 in advance, and the value of the table can be generated by acquiring statistics of combination of high and low energies in advance.

According to the present embodiment, since the learning data can be automatically generated using the article data and the additional data accumulated while performing the X-ray baggage inspection, an accuracy can be improved while operating the X-ray baggage inspection. Further, since the combination of articles can be made close to the operation, generation of learning data according to the operation can be expected. Further, the image is synthesized using the transmission amount of the area of the article specified by the color image and returns to the color image, whereby there is an effect that learning data capable of reproducing the overlap of the articles can be constructed.

What is claimed is:

1. An X-ray image processing system that processes an X-ray image including an image of a piece of luggage, using a processing apparatus that includes a processing unit that processes data and a storage unit, the processing unit comprising:
   an acquisition unit that acquires a plurality of pieces of X-ray transmission amount data using a plurality of sensors;
   an image generation unit that determines a material of an image in pixel units based on a difference between the plurality of pieces of X-ray transmission amount data thus acquired and generates a color image according to a material of an object;
   a recognition unit that recognizes articles in pixel units based on the color image thus generated; and
   a synthesis unit that synthesizes a background image and an article image using the X-ray transmission amount data for the same background,
   wherein the generated color image and the X-ray transmission amount data are stored in the storage unit,
   wherein information of the articles included in a first piece of luggage as a unit of the background is stored in the storage unit, and
   wherein the synthesis unit generates a color image by synthesizing a luggage image and the article image using the X-ray transmission amount data, based on the information of the articles stored in the storage unit.

2. The X-ray image processing system according to claim 1, wherein the storage unit includes a first table in which the number of the articles included in each luggage acquired by the acquisition unit is registered, and a second table in which image information and transmission amount data of the articles recognized by the recognition unit are registered in association with each other, and
   wherein the synthesis unit refers to the first table, selects the image information of the articles from the second table for combination of the articles having a high frequency of the combination of the articles, and performs an image synthesis.

3. The X-ray image processing system according to claim 1, wherein the color image generated by the synthesis unit is used as learning data.

4. An X-ray image processing method for processing an X-ray image including an image of an article of luggage using a processing apparatus that includes a processing unit that processes data and a storage unit, the method comprising:

acquiring a plurality of pieces of X-ray transmission amount data using a plurality of sensors;

determining a material of an image in pixel unit based on a difference between the plurality of pieces of X-ray transmission amount data thus acquired;

generating a color image according to a material of an object based on the X-ray transmission amount data;

recognizing articles in pixel unit based on the color image thus generated; and synthesizing a background image and an article image using the X-ray transmission amount data for the same background, wherein the generated color image and the X-ray transmission amount data are stored in the storage unit, wherein information of the articles included in a first piece of luggage as a unit of the background is stored in the storage unit, and wherein, in the synthesizing of a background image and an article image, a color image is generated by synthesizing a luggage image and the article image using the X-ray transmission amount data, based on the information of the articles stored in the storage unit.

5. The X-ray image processing method according to claim 4, wherein frequency information of the articles included in the same luggage is stored in the storage unit, and wherein, in the synthesizing of a background image and an article image, a color image is generated by synthesizing the luggage image and the article image using the X-ray transmission amount data for the articles having a high frequency of combination of the articles, based on frequency information of the articles stored in the storage unit.

6. The X-ray image processing method according to claim 4, further comprising specifying and adding the article that could not be recognized in the recognizing of articles from an input unit.

7. The X-ray image processing method according to claim 4, wherein the color image generated in the synthesizing of a background image and an article is used as learning data.

8. The X-ray image processing method according to claim 4, wherein a plurality of background images are stored in the storage unit, and wherein, in the synthesizing of a background image and an article image, one background image selected from the plurality of background images stored in the storage unit and the article image are synthesized.

* * * * *